Patented Jan. 23, 1923.

1,443,220

UNITED STATES PATENT OFFICE.

PHILIPPE AUGUSTE GUYE, OF GENEVA, SWITZERLAND, AND ALBERT SCHMIDT, OF PARIS, FRANCE, ASSIGNORS TO "L'AZOTE FRANCAIS," S. A., OF PARIS, FRANCE.

PROCESS FOR RECOVERING NITROGEN-OXIDE VAPORS.

No Drawing.   Application filed July 8, 1920.   Serial No. 394,850.

*To all whom it may concern:*

Be it known that we, PHILIPPE AGUSTE GUYE, a citizen of the Confederation of Switzerland, and ALBERT SCHMIDT, a citizen of the Republic of France, residing at Geneva, Switzerland, and Paris, in the Republic of France, have invented certain new and useful Improvements in Processes for Recovering Nitrogen-Oxide Vapors, of which the following is a specification.

The object of the present invention is a process for recovering nitrogen oxide vapors mixed with dry gases by means of alumina.

The experience on which the present invention is based, has proved, that if alumina $Al_2O_3$ is prepared in a perfectly anhydrous state, it gets the property to very easily absorb dry nitrous vapors (a mixture of $NO_2$ and $N_2O_3$), thereby giving an addition product (complex salt) approximately corresponding to the formula $2(Al_2O_3)NO_2$ in the case of gas $NO_2$. With the gas $N_2O_3$ the complexity is analogous. The lower temperature at which the alumina has been dehydrated the more readily will the nitrogen oxide gases be adsorbed thereby, and good results are obtained, if the temperature at which the water is extracated, does not exceed 400° C. It is however possible to go even lower with the temperature if the alumina is dehydrated in a vacuum.

The addition products between $Al_2O_3$ and the nitrous vapors, if heated to about 100°, will evolve all these vapors, for instance the dissociation tension of the compound $2(Al_2O_3)NO_2$ is at 71° C. about 1 atmosphere.

If alumina which has been dehydrated as said above is treated with dry gases containing very diluted nitrous vapors (such as they are obtained for instance in the manufacture of synthetic nitric acid with arc furnaces acting upon a dry mixture of nitrogen and oxygen), one needs only to bring the temperature of reaction below $-20°$ C. in order to realize a nearly complete absorption of these nitrous vapors. The dissociation tension of the above complex $(Al_2O_3)NO_2$ is for instance 1 mm. of mercury at $-20°$ C., or 0.1 mm. at $-30°$ C. or 0.007 mm. at $-40°$ C. The absorption is therefore practically complete between $-30$ and $-40°$ C. with the gases in which the volume of $NO_2$ does not exceed 0.5 to 1 %.

The process for recovering the nitrous vapors that are mixed with dry gases, which process is the subject of the present invention, is based upon the knowledge of these new data.

According to the invention these gases of a temperature which is between the ordinary temperature and $-80°$ C. are directed upon anhydrous alumina, from which the water had been extracated at a low temperature. The additional product formed between the alumina and the nitrous vapors is then heated in order to dissociate it and to evolve these vapors in a pure and concentrated state.

One may for instance proceed in the following manner: The dry gases containing nitrous vapors which are to be recovered, are directed upon alumina from which the water has been very carefully extracted at a low temperature. The temperature of the alumina itself must be kept so much lower as the nitrous vapors are more diluted. For instance if the vapors are concentrated the operation may take place at the usual temperature, with arc gases the temperature may be below $20°$, preferably $-30°$ to $-40°$C. In the case of extremely diluted vapors containing themselves a large proportion of $N_2O_3$ the respective temperature may be lowered to $-50°$ C. and even as far as $-80°$ C.

The addition product which is obtained in the above manner is then heated to a temperature exceeding 70° C. and being generally between 70 and 120° C. The nitrous vapors are condensed or collected in the usual way. If the nitrous vapors submitted to reaction with $Al_2O_3$ do only contain gas $NO_2$, this gas would be regenerated into a pure state.

For continuous operation two similar devices are made use of for proceeding as above described. Each one of the two devices absorb and evolve the nitrous gases alternatively.

Both operations (absorbing by $Al_2O_3$ and evolving nitrous vapors) can be carried out in the same apparatus. It is also possible to lower the temperature at which the nitrous vapors are evolved by keeping up a partial vacuum in the apparatus in which the complex salt is heated.

After having at a temperature of —40° C. recovered all the nitrous vapors contained in an arc gas of a yield of 0.5 to 1.0% it suffices to heat the mixture to +40° C. in a vacuum of 200 mm. in order to evolve the nitrous gases.

In the course of time it may happen that besides these additional products and traces of humidity which penetrate into the apparatus, hydrated nitrates of aluminium are formed, which subsequently will paralyze the absorption of oxides of nitrogen. It is in such a case only necessary to heat the mass to about 400° C. in order to recuperate the peroxide and to regenerate the alumina from which the water is fully extracted and suitable to work the same as before.

We claim as our invention:

1. A process for recovering nitrogen oxide vapors mixed with dry gases, comprising condensing them with anhydrous alumina obtained by dehydrating hydrous alumina at substantially not above 400° C.

2. A process for recovering nitrogen oxide vapors mixed with dry gases, comprising condensing them with anhydrous alumina obtained by dehydrating hydrous alumina at substantially not above 400° C., said vapors being directed at a temperature between normal and —80° C. upon said anhydrous alumina.

3. A process for recovering nitrogen oxide vapors mixed with dry gases, comprising condensing them with anhydrous alumina obtained by dehydrating hydrous alumina at substantially not above 400° C., said vapors being directed at a temperature between normal and —80° C. upon said anhydrous alumina, and then heating to dissociate the nitrogen oxide from the alumina.

4. A process for recovering nitrogen oxide vapors mixed with dry gases, comprising condensing them with anhydrous alumina obtained by dehydrating hydrous alumina at substantially not above 400° C., said vapors being directed at a temperature between normal and —80° C. upon said anhydrous alumina, and then heating said alumina while subjected to less than atmospheric pressure to dissociate the nitrogen oxide vapors therefrom.

In testimony whereof we affix our signatures in presence of two witnesses.

PHILIPPE AUGUSTE GUYE.
ALBERT SCHMIDT.

Witnesses:
 JULIETTE LANING,
 HUGH S. FOLLERTON.